United States Patent
Li

(10) Patent No.: US 12,002,302 B2
(45) Date of Patent: Jun. 4, 2024

(54) TRANSPORT MONITORING METHOD, APPARATUS AND SYSTEM

(71) Applicant: SUZHOU TEKNECT ENGINEERING CO., LTD XIANGCHENG BRANCH, Jiangsu (CN)

(72) Inventor: Heng Li, Suzhou (CN)

(73) Assignee: SUZHOU TEKNECT ENGINEERING CO., LTD XIANGCHENG BRANCH, Jiangsu (CN)

( * ) Notice: Subject to any disclaimer, the term of this patent is extended or adjusted under 35 U.S.C. 154(b) by 346 days.

(21) Appl. No.: 17/437,743

(22) PCT Filed: Mar. 11, 2019

(86) PCT No.: PCT/CN2019/077618
§ 371 (c)(1),
(2) Date: Sep. 9, 2021

(87) PCT Pub. No.: WO2020/181450
PCT Pub. Date: Sep. 17, 2020

(65) Prior Publication Data
US 2022/0148345 A1    May 12, 2022

(51) Int. Cl.
*G07C 5/04* (2006.01)
*B66F 9/075* (2006.01)
(Continued)

(52) U.S. Cl.
CPC .............. *G07C 5/04* (2013.01); *B66F 9/075* (2013.01); *G01L 5/0071* (2013.01);
(Continued)

(58) Field of Classification Search
CPC .......... G07C 5/04; G07C 5/008; G07C 5/085; G07C 2009/0092; B66F 9/075;
(Continued)

(56) References Cited

U.S. PATENT DOCUMENTS

| 2009/0095539 A1 | 4/2009 | Pfohl et al. |
| 2016/0247395 A1* | 8/2016 | Sugihara ................. G08G 1/20 |

(Continued)

FOREIGN PATENT DOCUMENTS

| CN | 85106408 A | 12/1986 |
| CN | 101934999 A | 1/2011 |

(Continued)

OTHER PUBLICATIONS

International Search Report (in English and Chinese) and Written Opinion of the International Searching Authority (in Chinese) issued in PCT/CN2019/077618, dated Dec. 17, 2019; ISA/CN.
First Chinese Office Action regarding Application No. 201980000485.5 dated Sep. 30, 2022. English translation provided by Unitalen Attorneys at Law.

*Primary Examiner* — Maceeh Anwari
*Assistant Examiner* — Jean W Charleston
(74) *Attorney, Agent, or Firm* — Harness, Dickey & Pierce, P.L.C.

(57) ABSTRACT

A method, apparatus and system for transportation monitoring are provided. The method includes: obtaining force change information of a transportation device detected by a detector; and monitoring, based on the force change information, a quantity of times of transportation that the transportation device loads a transportation object at an initial position, transports the transportation object to a target position, and unloads the transportation object at the target position.

9 Claims, 7 Drawing Sheets

(51) Int. Cl.
*G01L 5/00* (2006.01)
*G06Q 10/0639* (2023.01)
*G06Q 10/08* (2023.01)
*G07C 5/00* (2006.01)
*G07C 5/08* (2006.01)
*H04L 67/12* (2022.01)

(52) U.S. Cl.
CPC ....... *G06Q 10/06398* (2013.01); *G06Q 10/08* (2013.01); *G07C 5/008* (2013.01); *G07C 5/085* (2013.01); *H04L 67/12* (2013.01)

(58) Field of Classification Search
CPC ........ B66F 9/0755; B66F 9/22; G01L 5/0071; G06Q 10/06398; G06Q 50/28; G06Q 10/0639; G06Q 10/083; H04L 67/12; H04L 67/125; H04L 67/52
USPC ........................................................ 701/31.5
See application file for complete search history.

(56) References Cited

U.S. PATENT DOCUMENTS

| | | | |
|---|---|---|---|
| 2017/0121159 A1* | 5/2017 | Weiss | B66F 9/0755 |
| 2017/0140327 A1* | 5/2017 | Lindbo | B65G 1/0464 |
| 2018/0218320 A1* | 8/2018 | Lee | G06K 17/0022 |
| 2018/0300675 A1* | 10/2018 | Arena | G07C 9/00182 |
| 2018/0349849 A1* | 12/2018 | Jones | G06Q 10/08345 |
| 2021/0158466 A1 | 5/2021 | Li et al. | |

FOREIGN PATENT DOCUMENTS

| | | | | |
|---|---|---|---|---|
| CN | 103985167 A | * | 8/2014 | |
| CN | 104460477 A | * | 3/2015 | ........... G05B 19/048 |
| CN | 107203804 A | * | 9/2017 | ........... B66F 9/0755 |
| EP | 2518681 A1 | | 10/2012 | |
| KR | 20180089652 A | | 8/2018 | |

* cited by examiner

TRANSPORT MONITORING METHOD, APPARATUS AND SYSTEM

CROSS-REFERENCE TO RELATED APPLICATIONS

This application is a U.S. National Phase Application under 35 U.S.C. 371 of International Application No. PCT/CN2019/077618, filed on Mar. 11, 2019. The entire disclosure of the above application is expressly incorporated by reference herein.

FIELD

The present disclosure relates to the technical field of vehicle fleet management, and in particular to a method, an apparatus and a system for transportation monitoring.

BACKGROUND

At present, as a commonly used industrial handling vehicle, a forklift is mainly used for loading and unloading, stacking and short-distance transportation of palletized goods. The forklift plays a very important role in a logistics system of an enterprise, is a main force in material handling device, and is widely used in various sectors of the national economy such as a station, a port, an airport, a factory, and a warehouse.

In practice, in order to realize the supervision of the forklift and an operator, a vehicle fleet management system is generally set up by the enterprise to record the quantity of times of operations of the forklift and the operator. A utilization rate of the forklift and a work efficiency of the operator is analyzed based on the quantity of times of operations.

However, in the conventional art, the quantity of times that the operator uses the forklift to transport goods is generally manually recorded by the operator, which is troublesome and low in reliability.

SUMMARY

In view of this, a method, an apparatus and a system for transportation monitoring is provided according to the present disclosure, so as to solve the problem that the operator or a manager has to manually record the quantity of times of goods transportation in an operation process of a transportation device, which is troublesome and low in reliability.

In order to solve the above technical problem, the following technical solutions are provided according to the present disclosure.

A method for transportation monitoring is provided according to the disclosure. The method includes: obtaining force change information of a transportation device detected by a detector; and monitoring, based on the force change information, a quantity of times of transportation that the transportation device loads a transportation object at an initial position, transports the transportation object to a target position, and unloads the transportation object at the target position.

Optionally, the monitoring, based on the force change information, a quantity of times of transportation that the transportation device loads a transportation object at an initial position, transports the transportation object to a target position, and unloads the transportation object at the target position includes: determining, based on the force change information, status information of a transportation component for transporting the transportation object; and updating the quantity of times of transportation that the transportation device transports the transportation object in a case that it is monitored, by using the status information, that the transportation component loads the transportation object, transports the transportation object to the target position, and unloads the transportation object at the target position.

Optionally, the determining, based on the force change information, status information of a transportation component for transporting the transportation object includes: determining that the transportation object is loaded on the transportation component of the transportation device, in a case that a force value detected by the detector increases to be greater than a first threshold; and determining that the transportation object loaded this time is unloaded from the transportation component, in a case that the force value detected by the detector decreases to be less than the first threshold.

Optionally, the method further includes:
obtaining a first time difference between an unloading time when the transportation object loaded this time is unloaded from the transportation component and a loading time when the transportation object loaded this time is loaded on the transportation component; and remaining, in a case that the first time difference is less than a first duration threshold, the quantity of times of transportation that the transportation device transports the transportation object unchanged after determining that the transportation object loaded this time is unloaded, until a next obtained first time difference is no less than the first duration threshold; updating the quantity of times of transportation that the transportation device transports the transportation object, in a case that the next obtained first time difference is no less than the first duration threshold; where the next obtained first time difference is obtained by taking a time when the transportation object is unloaded next time as a new unloading time of the transportation object, and calculating a difference between the new unloading time and the loading time;
and/or;
obtaining a second time difference between the unloading time when the transportation object loaded this time is unloaded from the transportation component and a loading time when a transportation object loaded adjacent next time is loaded on the transportation component; and remaining, in a case that the second time difference is less than a second duration threshold, the quantity of times of transportation that the transportation device transports the transportation object unchanged, after determining that the transportation object loaded next time is unloaded.

An apparatus for transportation monitoring is provided according to the disclosure. The apparatus includes: a force information obtaining module configured to obtain force change information of a transportation device detected by a detector; and a monitoring module configured to monitor, based on the force change information, a quantity of times of transportation that the transportation device loads a transportation object at an initial position, transports the transportation object to a target position, and unloads the transportation object at the target position.

A system for transportation monitoring is provided according to the disclosure. The system includes: a detector configured to detect force change information; a memory configured to store a program for implementing the method for transportation monitoring described above; and a controller configured to load and execute the program stored in the memory. The program is executed to: obtain the force change information detected by the detector; and monitor, based on the force change information, a quantity of times of transportation that a transportation device loads a transportation object at an initial position, transports the transportation object to a target position, and unloads the transportation object at the target position.

It can be seen that, in this embodiment, the detector is used to automatically detect the force change information of the transportation device. Whether the transportation device is loaded with the transportation object may affect the actual force of the transportation device. Therefore automatic and accurate monitoring of the entire transportation process that, the transportation device loads the transportation object, transports the transportation object to the target position and unloads the transportation object, may be realized based on analysis of the force change information, thereby realizing automatic and accurate monitoring of the quantity of times of transportation performed by the transportation device without manual record of the quantity of times of transportation done by an operator such as a driver of the transportation device or a manager of the transportation object. The solution provided in this embodiment has a simple and convenient process, reduces labor cost, improves a statistical accuracy of the quantity of times of transportations, and further lays a reliable foundation for the subsequent use of the quantity of times of transportations for performance evaluation and other management purposes.

DETAILED DESCRIPTION OF THE EMBODIMENTS

The inventor of the present disclosure discovered that in existing transportation device such as a forklift, during a process of loading the transportation object and transporting the transportation object to the destination, the quantity of times of transportation is generally manually recorded by a driver of the transportation device or a manager of the transportation object, it is easy to miss or over-record, which may not only reduce a statistical reliability of the quantity of times of transportation, but also be more troublesome.

In order to solve the above problem, the inventor hopes that, the quantity of times of transportation that the transportation device transports the transportation object may be recorded automatically. Specifically, the inventor notices that, during the process that the transportation device loads the transportation object and the process that the transportation device unloads the transportation object, certain components of the transportation device may bear a regularly changed force. Therefore, the inventor proposes to determine when the transportation device loads the transportation object and when the transportation device unloads the transportation object by monitoring force changes of these components, and a reliable quantity of times of transportation that the transportation device transports the transportation object may be obtained.

The technical solutions according to the embodiments of the present disclosure will be described clearly and completely as follows in conjunction with the drawings in the embodiments of the present disclosure. It is apparent that the described embodiments are only a part of the embodiments according to the present disclosure, rather than all of the embodiments. Based on the embodiments of the present disclosure, all other embodiments obtained without creative efforts by those of ordinary skill in the art shall fall within the protection scope of the present disclosure.

In order to make the above objects, features, and advantages of the present disclosure more obvious and understandable, the present disclosure will be further described in detail below in conjunction with the accompanying drawings and specific embodiments.

Figure 1:
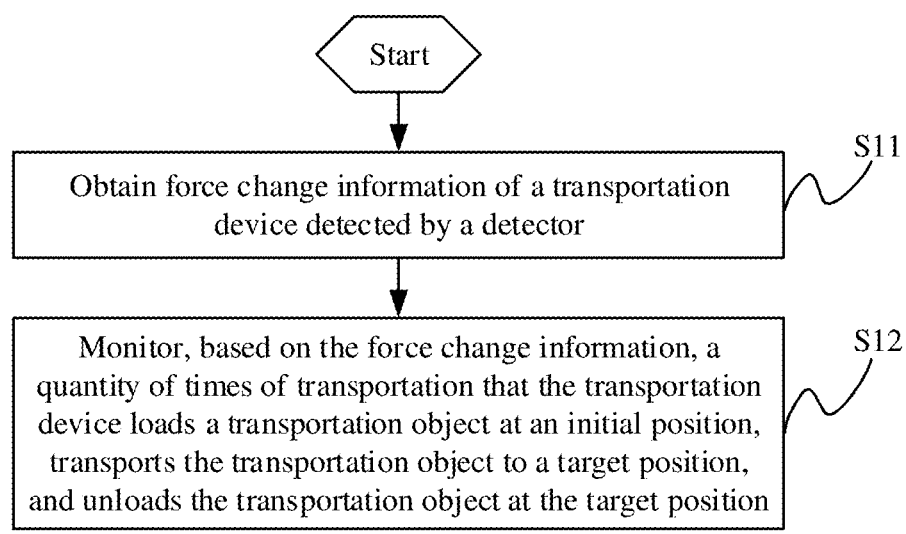
FIG. 1 is a schematic flowchart of a method for transportation monitoring provided according to an embodiment of the present disclosure.

Reference is made to FIG. 1, which is a schematic flowchart of a method for transportation monitoring according to an embodiment of the present disclosure. The method may be applied to a controller of a system for transportation monitoring, such as an on-board controller. As shown in FIG. 1, the method may include but not limited to the following steps S11 to S12.

In step S11, force change information of a transportation device detected by a detector is obtained.

In this embodiment, the force change information may be generated by a transportation component of the transportation device and generated at any stage of a stage that the transportation device loads the transportation object, a stage that the transportation device transports the transportation object to a target position, and a stage that the transportation device unloads the transportation object. Therefore, the force change information can reflect status information of the transportation component of the transportation device, and the force change information is used to determine whether the transportation component is currently loading/transporting/unloading the transportation object.

Optionally, the detector may be one or more of a pressure sensor, a tension sensor, a metal deformation switch, and the detector is not limited to the detectors listed herein. Different types of detectors may be installed on different components of the transportation device.

For example, the pressure sensor may be installed on the transportation component or an oil path of the transportation device. During a transition process of the transportation device in the status of no-load, loading, transporting, unloading, and no-load, a pressure value (which may also be referred to a force value) obtained by the pressure sensor may continue to change, and may be changed in a certain rule. In this case, the obtained force change information may include the pressure value and change information of the pressure value.

In a case that the pressure sensor is a hydraulic pressure sensor, an intensity of pressure may be directly sensed. After that, the pressure value is calculated by combining the intensity of pressure and the parameters such as an internal pipe diameter of the oil path of the transportation device. A process of using the parameters sensed by the hydraulic pressure sensor to calculate the pressure value is not limited in the present disclosure.

The tension sensor and the metal deformation switch may be installed on a chain of the transportation component, such as a root portion of the chain. In a case that the transportation device is loaded with the transportation object and a case that the transportation device is not loaded with the transportation object, tightness of the chain of the transportation component of the transportation device is different, that is, the chain bears different forces. In this embodiment, the tension sensor and the metal deformation switch may be used to obtain the force value and change information of the force value, so as to determine whether the transportation component is loaded with the transportation object. Therefore, for the tension sensor and the metal deformation switch, the obtained force change information may include the force value and change of the force value.

It can be seen that content of the obtained force change information may be different for different types of detectors or different installation positions of the detectors used in this embodiment. Regardless of the content of the force change information, the force change information can represent a transportation status of the transportation device for transporting the transportation object, and monitoring of the quantity of times of transportation may be further realized based on the force change information. The content of the force change information will not be described in detail in this embodiment.

In step S12, it is monitored, based on the force change information, a quantity of times of transportation that the transportation device loads a transportation object at an initial position, transports the transportation object to a target position, and unloads the transportation object at the target position.

The initial position may be a position where the transportation object is located, which is the position where the transportation object needs to be loaded on the transportation device for the first time, and the target position is a destination where the transportation object needs to be transported to.

Based on the above description of the force change information, the force change information can represent a status of the transportation component for transporting the transportation object. Therefore, in this embodiment, it can be accurately known, by analyzing the force change information, whether the transportation device is loaded with the transportation object currently, whether the transportation object is unloaded currently after the transportation object is transported to the target position. It is further automatically determined whether the transportation device has completed one transportation of the transportation object. For example, if it is determined that one transportation is completed, the quantity of times of transportation that the transportation device transports the transportation object is automatically increased by 1. If it is determined that one transportation is not completed, the quantity of times of transportation that the transportation device transports the transportation object is remained unchanged to ensure the reliability and accuracy of the obtained quantity of times of transportation.

It can be seen that, in this embodiment, the detector is used to automatically detect the force change information of the transportation device. Whether the transportation device is loaded with the transportation object may affect the actual force of the transportation device. Therefore automatic and accurate monitoring of the entire transportation process that, the transportation device loads the transportation object, transports the transportation object to the target position and unloads the transportation object, may be realized based on analysis of the force change information, thereby realizing automatic and accurate monitoring of the quantity of times of transportation performed by the transportation device without manual record of the quantity of times of transportation done by an operator such as a driver of the transportation device or a manager of the transportation object. The solution provided in this embodiment has a simple and convenient process, reduces labor cost, improves a statistical accuracy of the quantity of times of transportations, and further lays a reliable foundation for the subsequent use of the quantity of times of transportations for performance evaluation and other management purposes.

Figure 2:
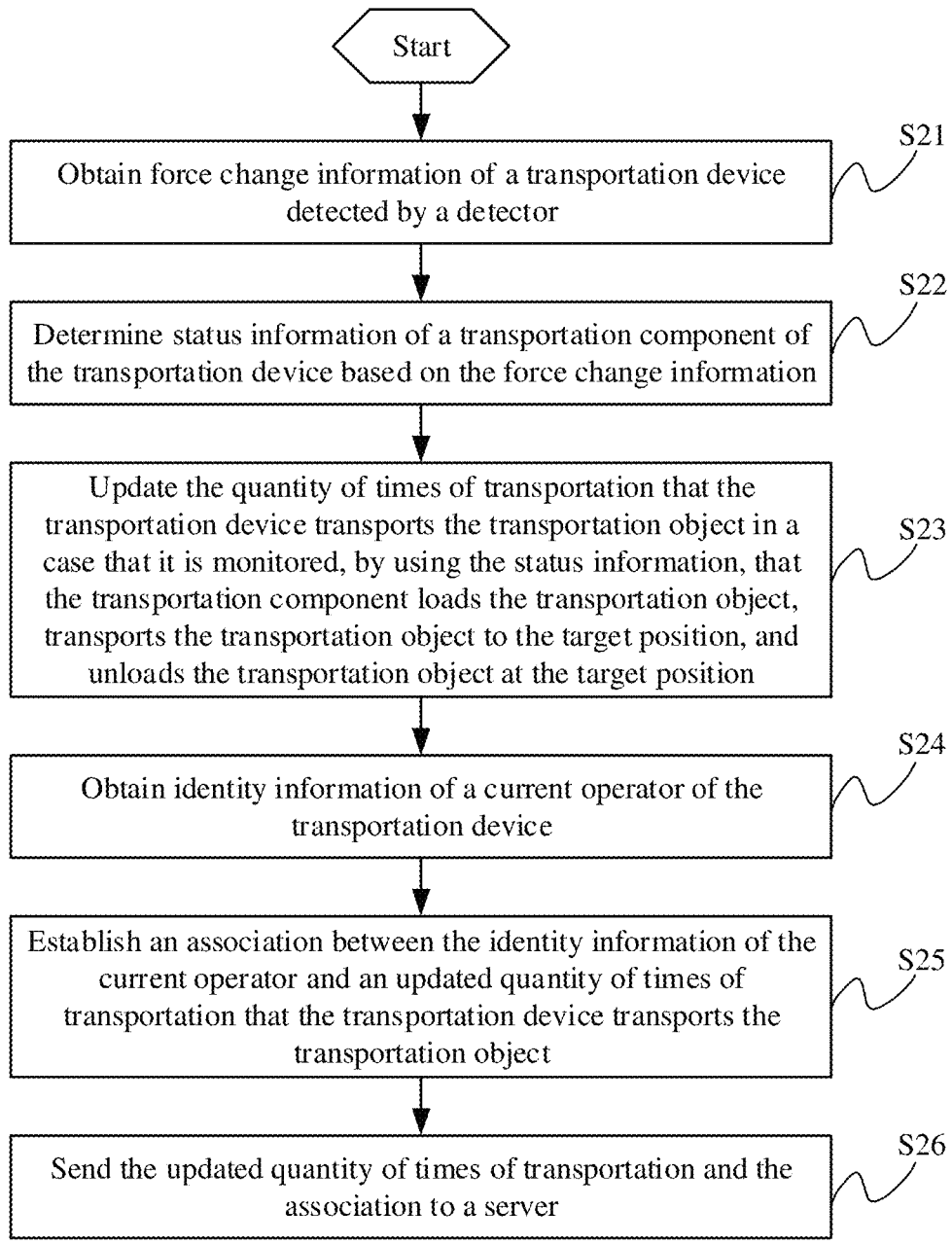
FIG. 2 is a schematic flowchart of a method for transportation monitoring provided according to another embodiment of the present disclosure.

In an embodiment, based on the core concept of the method for transportation monitoring provided according to the present disclosure described above, another embodiment of the present disclosure proposes a method for transportation monitoring, a schematic flow chart of which is shown in FIG. 2. The method may still be applied to the controller, the method may specifically include but is not limited to the following steps S21 to S26.

In step S21, force change information of a transportation device detected by a detector is obtained.

The implementation process of step S21 is similar to the implementation process of step S11 above, reference may be made to the description for the corresponding part of step S11.

In step S22, status information of a transportation component of the transportation device is determined based on the force change information.

Based on the description of the force change information above, the force change of the transportation device caused by loading, transporting or unloading the transportation object is actually the force change of the transportation component of the transportation device. Therefore, the force change information obtained in this embodiment is the force change information of the transportation component, The status information of the transportation component may be determined by analyzing the force change information. The status information may indicate whether the transportation component is loaded with a transportation object.

Optionally, the transportation device embodied as a forklift is taken as an example, the transportation component may be a structural part used to fork the transportation object. In practice, the transportation component may be in a descending status, an ascending status, or a transportation status. Different statuses represent different operating stages of the forklift. In this embodiment of the present disclosure, it may be pre-recorded the force change information detected by the detector in a case that the transportation component is loaded with the transportation object in different statuses. The force change information obtained in practice is analyzed based on the pre-recorded force change information to determine a current status of the transportation component.

In step S23, the quantity of times of transportation that the transportation device transports the transportation object is updated in a case that it is monitored, by using the status information, that the transportation component loads the transportation object, transports the transportation object to the target position, and unloads the transportation object at the target position.

In this embodiment, after obtaining the status information that indicates the status change of the transportation component, the status change of the transportation component may be determined by analyzing the status information. That is, it may be determined whether the transportation component is loaded with the transportation object, when the transportation object is loaded on the transportation component, whether the loaded transportation object is transported to the target position for unloading, and when the transportation object is unloaded. In addition, when it is determined that the transportation component loads the transportation object at the initial position, transports the transportation object to the target position, and unloads the transportation object at the target position, the quantity of times of transportation that the transportation device transports the transportation object is updated timely, and the method for updating the quantity of times of transportation is not limited in the present disclosure.

Optionally, if the total quantity of times of transportation performed by the transportation device needs to be counted, the quantity of times of transportation performed for each time may be added up. If the quantity of times of transportation of each type of transportation object performed by each driver of the transportation device needs to be counted, the quantity of times of transportation of each type of transportation object may be added up. If it is monitored that the transportation object is loaded and transported by the transportation component to the target position and is unloaded at the target position, the quantity of times of transportation of the transportation object in the same type with the current transportation object performed by a driver currently logging-in the transportation device may be obtained, and the obtained quantity of times of transportation is increased by 1. If the quantity of times of transportation of each type of transportation object performed by all driver of the transportation device needs to be counted, that is, the quantity of times of transportation of each type of transportation object needs to be counted, the quantity of times of transportation of the transportation object in the same type with the currently transported transportation object may be obtained, and the obtained quantity of times of transportation is increased by 1.

It can be seen that the method for updating the quantity of times of transportation may be determined in the present disclosure according to specific statistical requirements, and is not limited to the several methods for updating listed above. In practice, one or more of the methods for updating listed above may be adopted to realize the update of the quantity of times of transportation representing different meanings, which are not described in detail in this embodiment.

Alternatively, in the present disclosure, the quantity of times of transportation that the transportation device transports the transportation object (i.e., the quantity of times of transportation after the last update) may be uploaded to a server. The server may implement the statistical results of the above examples according to actual statistical requirements, thereby reducing a calculation amount of the controller.

In step S24, identity information of a current operator of the transportation device is obtained.

It should be noted that the current operator in step S24 of this embodiment may be the driver of the transportation device described above, that is, the person who logs in to the control system of the transportation device.

In the actual use of the transportation device, in order to realize the management of the transportation device and operators of the transportation device, grasp the working condition of each operator driving the transportation device, and grasp the working condition of the transportation device, it is generally necessary for the operator to input authentication information to the control system of the transportation device. The control system of the transportation device may be successfully logged into by the operator only after the authentication of the operator is passed, and the transportation device may be controlled by the operator through the control system within the authority scope of the operator.

In a case that a manager authorizes the operator to operate one or more transportation devices, the identity information of the operator is generally required to be inputted as an eligibility criteria for authentication information entered when the operator subsequently logs into to the control system of the transportation device. The identity information may include data for identifying the identity of the operator, such as an employee number, a name, a face image, fingerprint information of the operator. The present disclosure does not limit the content of the identity information.

In this embodiment, a scenario, that the quantity of times of transportation that each operator drives the transportation device to transport the transportation object is managed, is mainly described as an example. In a scenario of managing the quantity of times of transportation of other content described above, subsequent processing for the obtained updated quantity of times of transportation is similar, which is not repeated here.

In step S25, an association between the identity information of the current operator and an updated quantity of times of transportation that the transportation device transports the transportation object is established.

In step S26, the updated quantity of times of transportation and the association are sent to a server.

In practical applications of this embodiment, the manager or the operator wants to be able to visually view the total quantity of times of transportation that the operator transports the transportation object, so as to facilitate statistics of work performance of the operator. Therefore, the updated quantity of times of transportation is associated with the operator in this embodiment, the updated quantity of times of transportation is further uploaded to the server. After that, if the manager or the operator wants to view the quantity of times of transportation that the operator transports the transportation object, the manager or the operator may log in to the server and view the required data directly without view the transportation device.

It can be seen that in this embodiment, the operator logs into the control system of the transportation device, drives the transportation device to transport the transportation object, and after completing the transportation once, updates the current quantity of times of transportation, so that the controller of the transportation device can automatically count the quantity of times of transportation. After that, the last updated quantity of times of transportation may be uploaded to the cloud, that is, after the transportation is completed, the updated quantity of times of transportation is associated with the identity information of the operator, and the updated quantity of times of transportation is uploaded to the server, so that the manager and the operator can log in to the server for inquiring, which is more convenient.

In a case that the quantity of times of transportation is updated by directly updating the quantity of times of transportation associated with the identity information of the operator, after the quantity of times of transportation is updated, the updated quantity of times of transportation and association between the updated quantity of times of transportation and the identity information may be directly uploaded to the server, so that the server updates the currently stored quantity of times of transportation performed by the operator according to the association.

It can be seen that the implementation method of uploading the updated quantity of times of transportation that the operator transports the transportation object to the server and timely updating the quantity of times of transportation stored in the server proposed in the present disclosure is not limited to the implementation manner described in this embodiment, which may be flexibly chose according to the method for updating the quantity of times of transportation actually adopted by the controller.

Optionally, in this embodiment, the updated quantity of times of transportation may be periodically sent to the server. It is not limited to sending the updated quantity of times of transportation finally obtained to the server after the operator finishes driving as described above. Alternatively, during the driving process, after a certain time interval or in response to a control instruction inputted by an operator, the updated quantity of times of transportation currently obtained is sent to the server to update the historical quantity of times of transportation performed by the operator stored in the server.

In addition, the method that the server stores the quantity of times of transportation that each operator operates the transportation device to transport the transportation object is not limited in the present disclosure. The quantity of times of transportation may be classified and stored according to the operators, or may be stored according to different content represented by the quantity of times of transportation, such as the quantity of times of transportation that different operators transport various types of transportation objects, which is not be described here.

In addition, in the actual application of the present disclosure, after performing step S23 in which the quantity of times of transportation that the transportation device transports the transportation object is updated, the updated quantity of times of transportation may be directly uploaded to the server, and the uploading manner is not limited. For example, the uploading manner may be regularly uploading and uploading in response to operation instructions (e.g., the operator clicks an upload button). Specifically, according to the method described in this embodiment, the updated quantity of times of transportation is associated with the identity information of the current operator and then is uploaded to the server; or the updated quantity of times of transportation is associated with attribute information of the transportation device and then is uploaded to the server; or the updated quantity of times of transportation is associated with attribute information of the transportation object and then is uploaded to the server. The uploading manner may be specifically set according to actual requirements. The present disclosure only takes an implementation manner of uploading to the server described in the example shown in FIG. 2 as an example for illustration, but the present disclosure is not limited to the implementation manner described in the example shown in FIG. 2, and is not limited to several implementation manners listed in this paragraph.

As an optional embodiment of the present disclosure, this embodiment provides a more specific implementation step of the method for transportation monitoring, but in practice, based on the core concept of the method for transportation monitoring proposed in the present disclosure, the specific implementation manner is not limited to the implementation steps described in the optional embodiments herein. Those skilled in the art may make adaptive adjustments according to actual requirements, all of which belong to the scope of protection of the present disclosure and is described in detail herein.

Figure 3:
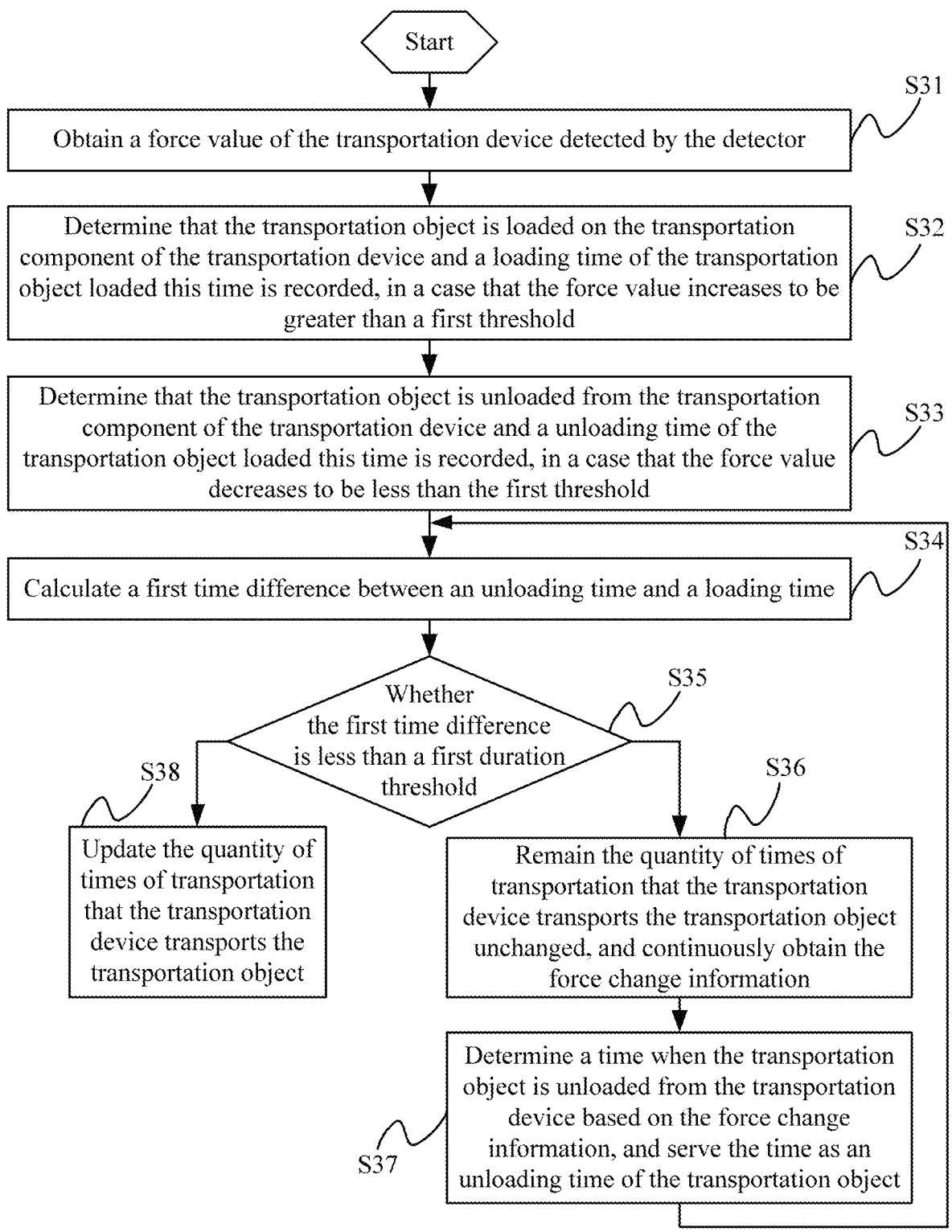
FIG. 3 is a schematic flowchart of a method for transportation monitoring provided according to another embodiment of the present disclosure.

Reference is made to FIG. 3, which is a schematic flowchart of a method for transportation monitoring according to another embodiment of the present disclosure. The method may still be applied to the controller. As shown in FIG. 3, the method may include but is not limited to the following steps S31 to S38.

In step S31, a force value of the transportation device detected by the detector is obtained.

It can be seen from the above description of the detector and the force change information detected by the detector, as the type and the installation position of the detector vary, the detected force value may indicate the force of different transportation components of the transportation device.

In practice, a motion travel range of the transportation component of the transportation device is generally limited. The motion travel range of the transportation component may be preset in the present disclosure according to the mechanical structure of the transportation component and an actual working condition of the transportation component, so that during the transportation component operates, the transportation component moves within the motion travel range to avoid damage caused when the transportation component moves beyond the motion travel range. The damage affects the normal operation of the transportation component and reduces the transportation efficiency. The content of the motion travel range of the transportation component of each transportation device is not limited in the present disclosure.

The motion travel range may represent a motion route and a position of the transportation component. A distance between the transportation device and the transportation object loaded on the transportation component, and a height of the transportation component from the ground during the operation of the transportation component may be obtained from the motion travel range.

Moreover, the force value of the transportation component may vary greatly when the transportation component of the transportation device is at different stages within the entire motion travel range. Therefore, in the above steps for obtaining the force value, the motion travel of the transportation component may be considered in the present disclosure. Specifically, the motion travel of the transportation component of the transportation device may be obtained. In a case that the motion travel meets a preset condition, that is, the motion travel is within the motion travel range of the transportation component, the force value of the transportation device detected by the detector is obtained. In a case that the motion travel does not meet the preset condition, the detector is controlled to stop detecting the force value of the transportation device, or is controlled to stop responding to the force value detected by the detector.

In a case that the motion travel does not meet the preset condition, that is, the motion travel is beyond the motion travel range, a current status of the transportation component remains unchanged until the obtained motion travel meets the preset condition. Then the current status of the transportation component is updated in a case that the obtained motion travel meets the preset condition. For example, in a case that a motion travel of the transportation component is beyond the motion travel range and the transportation component of the transportation device is in a loaded status, the loaded status of the transportation component may be remained until the motion travel of the transportation component returns to be within the motion travel range, and then the loaded status of the transportation component is updated when the motion travel of the transportation component is within the motion travel range. In a case that the motion travel of the transportation component is beyond the motion travel range and the transportation component of the transportation device is in an unloading status, the quantity of times of transportation performed by the transportation device may be updated according to the method described above, and when the transportation component is detected to be in the unloading status later, the quantity of times of transportation is not updated.

Meaning of the motion travel of the transportation component may be determined based on the working principle of the transportation component of the transportation device. For example, the transportation component is capable of moving up and down relative to the transportation device. The transportation device embodied as a forklift and the transportation component embodied as a pallet fork are taken as an example for illustration. Generally, the pallet fork moves to the bottom of the forklift. After loading the goods, the pallet fork may move upward for a certain motion travel and then stop. The forklift may be in a moving status to realize the transportation of the goods. After arriving at the destination, the pallet fork may move downward to unload the goods. The specific content of the motion travel of the transportation component is not limited in the present disclosure.

Optionally, the motion travel of the transportation component may be obtained by using data detected by a photoelectric sensor, a travel switch, a proximity switch or other types of sensors, and the present disclosure does not limit the specific detection method of the motion travel.

In combination with the above description, it should be understood that, in addition to the sensors listed above, the detector in the present disclosure may further include one or more of a position sensor, a photoelectric sensor, a travel sensor, and a proximity switch installed on the transportation device. Specific installation positions of these detectors may be determined based on working principles of the detectors and motion trails of the transportation component, which is not described in detail here.

It should be noted that, the transportation components of different types of transportation devices may not move up and down during the working process, but may adopt other moving manners such as moving left and right. Generally, in a case that the transportation component loads the transportation object and in a case that the transportation component unloads the transportation object, the transportation component needs to move in different directions relative to the transportation device, which is not limited to the working method of the pallet fork in the forklift described above.

In summary, during the execution of step S31 in this embodiment, in a case that the motion travel of the transportation component of the transportation device is determined to be within a preset motion travel range, the force change information of the transportation device detected by the detector is obtained, such as performing the step S31. In step S32, it is determined that the transportation object is loaded on the transportation component of the transportation device and a loading time of the transportation object loaded this time is recorded, in a case that the force value increases to be greater than a first threshold.

In step S33, it is determined that the transportation object is unloaded from the transportation component of the transportation device and a unloading time of the transportation object loaded this time is recorded, in a case that the force value decreases to be less than the first threshold.

Generally, a case that the force value increases may indicate that the transportation component is loading the transportation object. A case that the force value is maintained within a larger numerical range may indicate that the transportation component is loaded with the transportation object and the transportation component is transporting the transportation object. A case that the force value decreases may indicate that the transportation component is unloading the transportation object. Therefore, in this embodiment, the current status of the transportation component may be determined through a change in the force value obtained in real time or periodically.

Therefore, in this embodiment, a transportation status of the transportation device may be determined by monitoring the change in the force value. Specifically, a force value of the transportation device under no-load status may be determined in advance, and an allowable error value may be set on the determined force value to obtain a force value range serving as a first threshold. Generally, the first threshold is greater that the force value of the transportation device in the no-load status. A specific value of the first threshold is not limited here, and may be determined based on factors such as different transportation positions and transportation device in different periods.

In this way, in a case that the controller monitors that the obtained force value continuously increases to be greater than the first threshold, it may be considered that the transportation component starts to load the transportation object, that is, the transportation device starts to be loaded. In a case that the controller monitors that the obtained force value continuously decreases to be less than the first threshold, it may be considered that the transportation object is unloaded from the transportation component, that is, the transportation device is in the no-load status again.

However, the maximum forces that the transportation components of different transportation devices can bear are generally different. In the present disclosure, the second threshold that the transportation component of the transportation device can bear may be predetermined through experience or experiment. In a case that the force value of the transportation component exceeds the force threshold, the transportation device may be overloaded or even unable to operate. Therefore, in the present disclosure, after it is determined that the force value of the transportation component is greater than the first threshold and the transportation object is loaded on the transportation component, it may be determined whether the force value continuously increases to be greater than the second threshold. In a case that the force value increases to be greater than the second threshold, a preset operation may be performed, such as outputting an overload alarm message, or controlling the transportation device to stop operation. In a case that the force value does not increase to be greater than the second threshold, that is, the force value is greater than the first threshold and less than the second threshold, the transportation device is operated to continue the transportation work. The second threshold is greater than the first threshold, and the present disclosure does not limit the specific values of the first threshold and the second threshold.

Optionally, the above determination process of whether the force value is greater than the second threshold may be implemented during the process that the transportation object is loaded on the transportation device, which is not described in embodiments hereinafter.

Furthermore, a load capacity of the transportation device depends on a position of the transportation component in the transportation device. For example, the higher the height of a forklift, the smaller the load capacity of the forklift; the farther goods loaded by a pallet fork are away from a vehicle body of the forklift, the smaller the load capacity of the forklift. Therefore, the maximum force value that the transportation device can bear is related to the motion travel range of the transportation component of the transportation device. In the present disclosure, the motion travel range of the transportation component of the transportation device may be correlated with the second threshold. In this way, during actual operation of the transportation device, whether a motion travel of the transportation component of the transportation device exceeds the motion travel range of the transportation component and whether the force value of the transportation device reaches the second threshold corresponding to the motion travel range may be monitored. If the motion travel of the transportation component of the transportation device does not exceed the motion travel range and the force value of the transportation device does not reach the second threshold, the subsequent transportation status may be monitored. In other cases, corresponding alarm information may be outputted.

Optionally, in the present disclosure, transportation duration that the transportation device transports the transportation object for one time may be obtained by timing the start and the end of loading, so as to calculate the total transportation duration of the transportation device or the operator, and thereby determining the work efficiency of the operator.

In step S34, a first time difference between an unloading time and a loading time is calculated.

In step S35, it is determined whether the first time difference is less than a first duration threshold. In a case that the first time difference is less than the first duration threshold, step S36 is performed. In a case that the first time difference is no less than the first duration threshold, step S37 is performed.

In step S36, the quantity of times of transportation that the transportation device transports the transportation object is remained unchanged, and the force change information is continuously obtained.

In a process that the transportation object is transported by the transportation device, due to factors such as uneven transportation roads and obstacles, the transportation device generally experiences bumps and vibrations. In a case that a vibration amplitude of the transportation device is relatively large, the obtained force value of the transportation device may experience relatively large fluctuations, which may result in a case that the transportation object may be mistakenly believed that being unloaded, and even a case that the transportation object on the transportation component of the transportation device falls, so that the first time difference calculated this time is less than the first duration threshold, that is, the transportation duration obtained this time is less than a duration required by a normal transportation for one time.

For the controller of the transportation device, although the transportation object is not unloaded at the target position, the controller still obtains the force change information that indicates the loading and unloading of the transportation object. In order to prevent detection results, that the transportation object is mistakenly believed to be unloaded halfway or the transportation object is accidentally unloaded, from affecting the accuracy of the statistical result of the quantity of times of transportation, in this embodiment, whether to update the quantity of times of transportation that the transportation object is transported after the transportation object is unloaded this time is determined by monitoring whether the first time difference is less than the first duration threshold. The monitoring method is not limited in this embodiment.

The above first duration threshold may be calculated according to a distance between the initial position and the target position of the transportation object to be transported, and a transportation speed of the transportation device, that is, duration=distance/transportation speed. In this embodiment, after an allowable error is set for the calculated duration, the first duration threshold may be obtained, the first duration threshold is used to verify the above first time difference. It should be noted that the method for obtaining the first duration threshold is not limited here.

In addition, it should be noted that, the detector in the transportation device may start to detect the force value in a case that the transportation device starts to work, such as an operator successfully logs into the control system of the transportation device and sends an operating instruction to the control system of the transportation device. In the entire working process of the transportation device, the detector may always be in the working status, may detect the force value in real time or periodically, and send the detected force value to the controller. Of course, the controller is further possible to actively obtain the force value from each detector, which is not limited in this embodiment.

The process of continuing to obtain force information in step S36 is similar to the process in step S31 above, and is not described in detail here.

In step S37, a time when the transportation object is unloaded from the transportation device is determined based on the force change information, and the time is served as an unloading time of the transportation object, and the method returns to perform step S34.

Following the above description, in this embodiment, if it is determined that the transportation object is unloaded from the transportation device halfway or the transportation object is mistakenly believed to be unloaded due to the force value fluctuations, the quantity of times of transportation that the transportation device transports the transportation object may not be updated after the transportation object is unloaded this time, and the obtained force change information (which is constantly updated over time) may continue to be analyzed. For example, the obtained force change information is analyzed by the analysis method of the force value described in step S32 and step S33 above, the time when the transportation object is unloaded next time is served as a new unloading time of the transportation object. Whether the first time difference reaches the first duration threshold continues to be verified to determine whether the transportation device transports the transportation object to the target position, and ensure that the quantity of times that the transportation object is transported is updated once in a process that the transportation object is loaded on the transportation device at the initial position and is transported to the target position, which improves the accuracy and reliability of statistic of the quantity of times of transportation.

Figure 4:
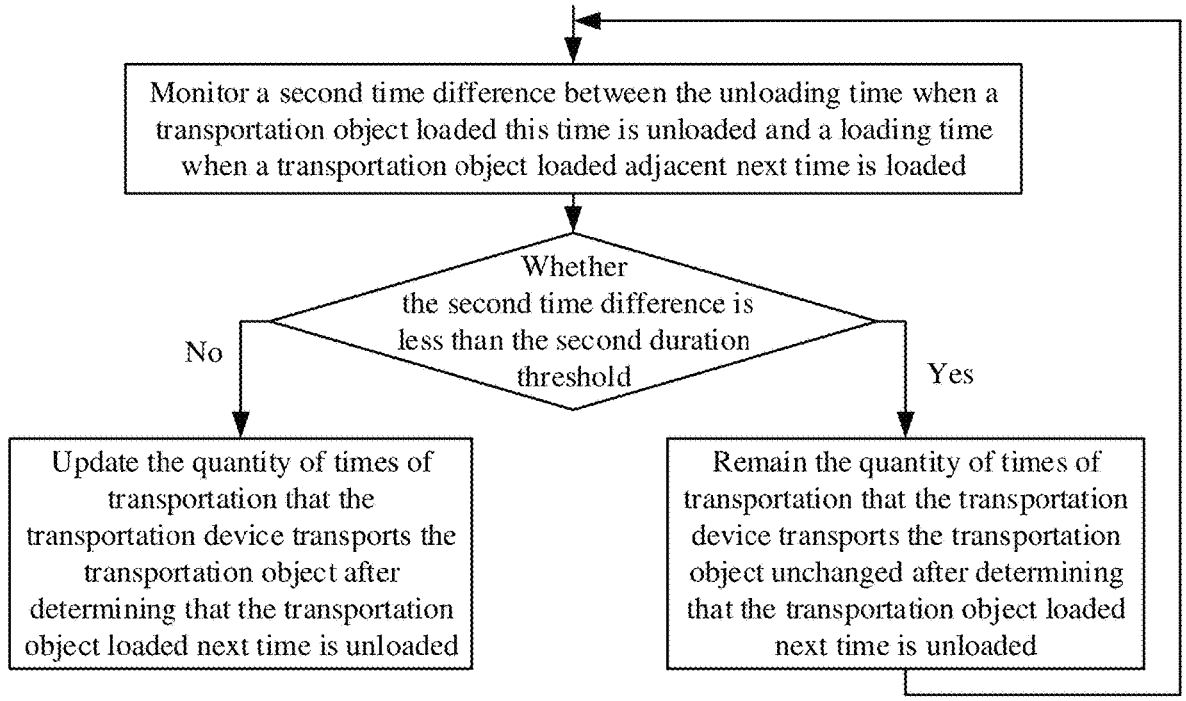
FIG. 4 is a schematic flowchart of a method for transportation monitoring provided according to another embodiment of the present disclosure.

As another optional embodiment of the present disclosure, the method for improving the accuracy and reliability of statistic of the quantity of times of transportation is not limited to the implementation method given above. Since after the transportation object is unloaded from the transportation device, the transportation device still need to takes a certain amount of time to reach the position where a new transportation object is located to load the new transportation object. Therefore, referring to the schematic flow chart of a method for transportation monitoring shown in FIG. 4, in the process that the transportation device transports the transportation object, it is obtained a second time difference between the unloading time when the transportation object loaded this time is unloaded from the transportation component and a loading time when a transportation object loaded adjacent next time is loaded on the transportation component. In a case that the second time difference is less than the second duration threshold, the transportation object unloaded this time may be considered as the same transportation object with the transportation object loaded adjacent next time. That is to say, a case that the transportation object is unloaded determined this time is not a case that the transportation object is transported to the target position and unloaded at the target position. The case that the transportation object is unloaded determined this time may be a case that the transportation object is accidentally unloaded halfway or is mistakenly believed to be unloaded (the reason may be referred to that the force value fluctuates greatly due to factors such as bumps analyzed above). In order to avoid repeated recording of the quantity of times of transportation for the same transportation object, in this embodiment, the quantity of times of transportation that the transportation device transports the transportation object is remained unchanged, after determining that the transportation object loaded adjacent next time is unloaded.

The method for obtaining the second duration threshold is similar to the method for obtaining the first duration threshold, the second duration threshold may also be obtained by calculating a quotient of a distance and a vehicle speed. In practice, in a case that the transportation device transports the transportation object to the target position and returns to the initial position without load to load a new transportation object, a return speed of the transportation device may be greater and the distance remains unchanged, so the obtained second duration threshold may be greater than the first duration threshold. Values of the first duration threshold and the second duration threshold and methods for obtaining the first duration threshold and the second duration threshold are not limited in the present disclosure.

In view of this, in order to ensure that the obtained quantity of times of transportation is generated from the detection results of transporting the transportation object from the initial position to the target position. In the present disclosure, a loading time when the transportation device loads the transportation object and an unloading time when the transportation device unloads the transportation object may be recorded. Further, a time difference between the loading time and the unloading time of the same transportation, or a time difference between the unloading time and the loading time of two adjacent transportations, or a combination of above two implementation methods may be adopted to verify whether the transportation device transports the transportation object to the target position. Therefore, it may be ensured that the quantity of times of transportation is updated once in a case that a certain transportation object is transported from the initial position to the target position, and the specific timing for updating the quantity of times of transportation is not limited.

According to the method described in the above embodiment, the quantity of times of transportation is updated when the transportation object is determined to be unloaded through the analysis of the force change information for the first time. In a case that the unloading this time is detected as not actually unloading the transportation object at the target position, the quantity of times of transporting the transportation object is not updated when a subsequent unloading of the transportation object is detected. Alternatively, in the present disclosure, the quantity of times of transporting the transportation object may be updated after the transportation object is finally determined to be transported to the target position.

It should be noted that this embodiment is mainly illustrated for the scenarios where the transportation object may be unloaded halfway once or mistakenly believed to be unloaded once in a process of transporting the transportation object to the target position. For situations that the same transportation object may be loaded and unloaded multiple times, when the transportation object is determined to be unloaded and/or loaded, verification may be performed according to the above corresponding method, which is not described here.

As another optional embodiment of the present disclosure, unlike the verification method based on the time difference proposed above, in this embodiment, a transportation position during the transportation device transports the transportation object may be directly monitored. For example, if it is determined, by analyzing of the force change information, that the transportation component of the transportation device is loaded with the transportation object, a loading position where the transportation object is loaded may be recorded, and/or if it is determined that the transportation object is unloaded from the transportation component of the transportation device, an unloading position where the transportation object is unloaded may be recorded. After that, if it is determined that the unloading position is the target position of the transportation object, the quantity of times of transporting the transportation object is updated. Alternatively, the recorded loading positions and unloading positions of the transportation object are analyzed; before the transportation object is transported to the target position, after the quantity of times of transporting the transportation object is updated once when the transportation object is unloaded or mistakenly considered as unloaded at a certain time, the quantity of times of transporting the transportation object is not updated when determining that the transportation object is subsequently transported to the target position for unloading, so as to ensure that during a transportation process that the same transportation object is transported from the initial position to the target position, the quantity of times of transporting the transportation object is only update once.

Information about loading positions/unloading positions where the transportation component of the transportation device loads/unloads the transportation object may be obtained by using a position detection device such as GPS. Alternatively, a wireless communication channel is established with the transportation device. For example, WIFI, Bluetooth, ultra-wideband or the like are used to establish the wireless communication channel. A position of the transportation device is monitored by using the wireless communication channel, to realize a recording of the information about the loading positions and unloading positions where the transportation device loads/unloads the transportation object. The method for obtaining the loading position and unloading position of the transportation object is not limited in the present disclosure.

Optionally, in the present disclosure, the motion travel of the transportation component of the transportation device and the obtained force change information may be combined, or motion speed change information of the transportation device and the obtained force change information may be combined to determine whether the transportation object loaded on the transportation device accidentally falls and the transportation object is mistakenly considered as being unloaded.

Specifically, the motion travel and the force change information of the transportation component of the transportation device may be obtained in the present disclosure. If the motion travel indicates that the transportation component is at a preset position, and the force change information indicates that a force difference, between a force value of the transportation component obtained at the current moment and a force value of the transportation component obtained at a previous moment, is greater than a force threshold, it may be considered that the transportation object loaded on the transportation component falls off. The preset position of the transportation component may be a certain position during a motion of the transportation component within the motion travel range of the transportation component, performed after the transportation object is loaded and before the transportation object is unloaded, and a specific coordinate of the preset position is not limited.

A scenario that a forklift using a pallet fork to transport goods is still taken as an example. In the present disclosure, the motion travel and force change information of the pallet fork may be obtained. If it is determined that the pallet fork moves to a preset position (e.g., a position different from a higher position for loading/unloading the transportation object) and the force value suddenly becomes smaller, it may be determined that the goods on the pallet fork falls off. In this case, according to the method for transportation monitoring described in the above embodiment, the goods may be mistakenly considered as unloaded from the forklift and one time of transportation is completed. In order to avoid this misjudgment from reducing the accuracy of the obtained quantity of times of transportation, in the present disclosure, whether the goods falls off accidentally from the pallet fork is determined according to the above detection method. If the goods are not normally unloaded, the quantity of times of transporting the goods is not updated. After the goods are reloaded on the pallet fork and transported to the target position for unloading, the obtained quantity of times of transporting the goods is updated. Alternatively, in a case that the goods are determined as accidentally falling off from the pallet fork, the quantity of times that the forklift transports the goods is updated, afterwards, in a process that the pallet fork reloads the fall-off goods and transport the goods to the target position for unloading, the quantity of times that the forklift transports the goods is not updated, so as to ensure that the quantity of times of transportation is updated once in a process that the forklift transports the same goods.

The method of monitoring the actual transportation situation of the transportation object in combination with the change in the motion speed of the transportation device is described by taking the above scenario that a forklift transports goods as an example. In a case that a motion speed or an acceleration of the forklift is determined as being not significantly reduced by analyzing the obtained motion speed of the forklift and the force of the pallet fork suddenly decreases, the goods on the pallet fork may also be considered as accidentally falling off. In this case, the several methods listed above may be used to ensure that in one entire transportation that the forklift transports the goods, the quantity of times that the goods are transported is updated once, and specific implementation process is not repeated in this embodiment.

It should be noted that, there may be a transportation abnormality during a process that the transportation device transports the transportation object. For example, the transportation abnormality may be that the transportation object falls off from the transportation component, the transportation object is violently bumped on the transportation component, and the transportation object temporarily hangs in the air. The transportation abnormality causes the force value of the transportation component to suddenly decrease in the transportation process, or causes the force value to suddenly decrease and restore to the force value before the sudden change in a short period of time, etc. Only analyzing the change of the force value is easy to update the quantity of times of transportation for multiple times during one transportation of the same transportation object. Therefore, in order to ensure the accuracy of the quantity of times of transportation, the method described above may be adopted by the present disclosure to obtain other data of the transportation component (e.g., a time difference of the above force value change, a motion travel and a motion speed of the transportation component, etc.). The force change information is combined with the above other data to realize the update of the quantity of times of transporting the transportation object, which is not limited to the several implementation methods listed above.

In summary, in the present disclosure, a change of the force value of the transportation device during the transportation device transports the transportation object may be monitored, and verification results of time differences in predetermined stages (e.g., a stage of loading and unloading the transportation object this time, and a stage between unloading the transportation object loaded this time and loading the transportation adjacent next time, etc.) are also considered to ensure that in the one entire transportation that the transportation device transports the transportation object from the initial position to the target position for unloading, the quantity of times of transportation is updated only once, thereby further ensuring the accuracy and reliability of the obtained quantity of times of transportation. In addition, according to actual requirements, the several implementation methods described above may be flexibly chose in the present disclosure to realize transportation monitoring and achieve the above technical effect of the present disclosure. The present disclosure is not limited to the implementation methods given herein.

Optionally, on the basis of the above embodiments, in the present disclosure, an automatic statistic of a total transportation weight, i.e., a load value of the transportation object transported by the transportation device may be realized without manual record performed by an operator or other managers during a process of counting the quantity of times that the transportation device transports the transportation object, which improves the accuracy of statistical results and reduces labor cost. Classified statistics may be further performed according to actual requirements to further reduce manual workload. Regarding the process of counting the quantity of times of transportation, reference may be made to the description of the above embodiments, which is not repeated in this embodiment. This embodiment mainly describes the process of statistic of the load value.

Based on the above description of the method for obtaining the force value, in this embodiment, a first force value of the transportation device after the transportation object is loaded on the transportation device and a second force value of the transportation device in a case that the transportation object is not loaded on the transportation device may be obtained. A load value of the transportation object transported by the transportation device this time is obtained based on a force difference between the first force value and the second force value. Further, load values of the transportation objects corresponding to multiple transportations are accumulated to obtain the total load value of the transportation objects transported by the transportation device. After that, the obtained total load value and the load value of the transportation object transported each time may be uploaded to the server. The specific implementation process may refer to the method of uploading the quantity of times of transportations above, which is not repeated in this embodiment.

The force value of the transportation device is basically stable within a certain range after the transportation object is loaded. In order to obtain an accurate force value of the transportation component, in this embodiment, the force value of the transportation device may be obtained after the transportation device operates stably. A timing to obtain the first force value may be specifically determined by using other external devices, which is not limited in the present disclosure.

Optionally, device such as an acceleration sensor may be adopted in the present disclosure to monitor an operating status of the transportation device, to determine whether the transportation device is currently operating stably. In a case that the transportation device is determined to be in a stable status, a force value detected in this stage is obtained in response to an instruction and the obtained force value is regarded as the first force value. It can be seen that, in this embodiment, an external input signal (i.e., an instruction) may be used to determine the timing of obtaining the first force value. The external input signal may be sent by a sensor, or be inputted by an operator in a case that the operator determines that the transportation device is in a stable status based on experience, which is not limited in the present disclosure.

Of course, an algorithm may be adopted to analyze the obtained continuous force value. In a case that the analysis result shows that a change amount of the force value within a preset time period is less than a change threshold, that is, the force value changes relatively little over a period of time, the transportation device may be determined as operating in a stable status, and the force value obtained at this time may be recorded. Specifically, the force values obtained at different moments may be filtered by the algorithm to filter out abnormal values. The changes of the remaining force values may be analyzed to obtain a force value at a stage during which the force value remains basically unchanged. The obtained force value is regarded as the first force value, the method for obtaining the first force value is not limited in the present disclosure.

The second force value is actually the force value of the transportation component of the transportation device when the transportation device is not loaded. The second force value may be detected after the transportation object is unloaded from the transportation device as described above, or may be obtained before the transportation object is loaded. In order to further improve the accuracy of the load value, the second force value of the transportation device not loaded currently may be obtained each time before the transportation object is loaded or after the transportation object is unloaded. A specific method for obtaining the second force value is not limited in the present disclosure.

Based on the description of relevant part of the above embodiments, in this embodiment, a motion travel of the transportation component may be considered when controlling the obtaining of the first force value and/or the second force value. For example, in a case that the motion travel of the transportation component is in a preset motion travel range, the first force value is obtained. A specific implementation process is not described in this embodiment.

In addition, in practice, for the force change information detected by different detectors, meaning of the force value may be different. Therefore, the force value may not directly represent the load value. In the present disclosure, an association between the force value detected by a detector and the load value of the transportation device where the detector is located is generated for different detectors. In this way, after the difference between the first force value and the second force value is obtained according to this embodiment, the load value of the transportation object transported by the transportation device this time may be determined according to the pre-established association between the force value and the load value.

Optionally, in order to improve the detection accuracy, a difference of the force values detected by each of various detectors may be obtained in the present disclosure, and the load value of the transportation object is obtained based on the obtained multiple differences. For example, the detectors may include a pressure sensor and a tension sensor. The first force value obtained by the pressure sensor may be the first pressure value, and the second force value may be the second pressure value. In this case, the obtained difference may be a first difference between the first pressure value and the second pressure value. After that, the first load value of the transportation object is obtained based on the first difference. In the same way, the second load value of the transportation object is obtained based on the second difference between the first tension value and the second tension value obtained by the tension sensor. After that, in the present disclosure, an average value, an intermediate value of the first load value and the second load value may be used as a target load value of the transportation object. According to this method of obtaining the load value of the transportation object, force values detected by multiple detectors may be obtained in the present disclosure, and the target load value of the transportation object is obtained according to the above processing method, which is not described in detail here.

It should be noted that, the time when the load value of the transportation object is calculated is not limited in the present disclosure, and in order to improve the work efficiency, the load value may be completed during a process that the transportation device transports the transportation object. In this case, the second force value may be obtained before loading the transportation object, but the time for calculation is not limited to the above description.

Optionally, obtained load values of the transportation objects may be counted in the present disclosure. Specifically, accumulation of load values may be performed according to different types of transportation objects, or according to different transportation devices, so as to calculate the work efficiency of the transportation device. The accumulation of load values may further be performed according to different operators, so as to calculate the work efficiency of each operator. A specific implementation of counting load values of the transportation objects is similar to the method of counting the quantity of times of transportation described above, and which is not described here.

Figure 5:
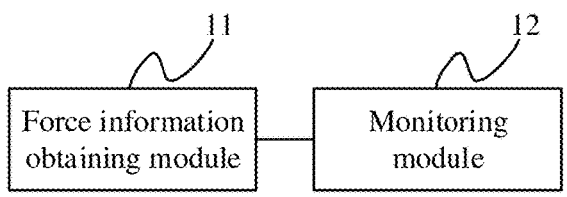
FIG. 5 is a schematic structural diagram of an apparatus for transportation monitoring provided according to an embodiment of the present disclosure.

Reference is made to FIG. 5, which is a schematic structural diagram of an apparatus for transportation monitoring provided according to an embodiment of the present disclosure. The apparatus may be applied to a controller. As shown in FIG. 5, the apparatus may include, but is not limited to a force information obtaining module 11 and a monitoring module 12.

The force information obtaining module 11 is configured to obtain force change information of a transportation device detected by a detector. The content and obtaining method of the force change information may refer to the description of the corresponding part of the method embodiment above.

Optionally, the force information obtaining module 11 may include a motion travel obtaining unit, a first force value obtaining unit and a first control unit.

The motion travel obtaining unit is configured to obtain a motion travel of the transportation component of the transportation device.

The first force value obtaining unit is configured to obtain the force value of the transportation device detected by the detector, in a case that the motion travel meets a preset condition.

The first control unit is configured to: control the detector to stop detecting the force value of the transportation device or control the detector to stop responding to the force value detected by the detector, in a case that the motion travel does not meet the preset condition; and/or remain a current status of the transportation component unchanged until the obtained motion travel meets the preset condition, and update the current status of the transportation component in a case that the obtained motion travel meets the preset condition.

The monitoring module 12 is configured to monitor, based on the force change information, a quantity of times of transportation that the transportation device loads a transportation object at an initial position, transports the transportation object to a target position, and unloads the transportation object at the target position.

Figure 6:
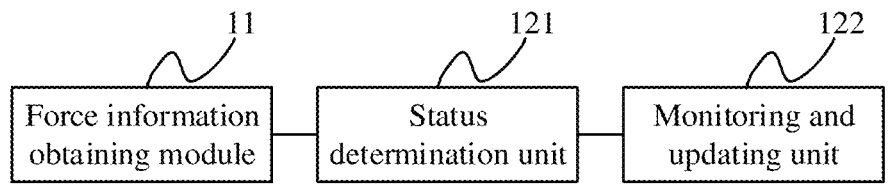
FIG. 6 is a schematic structural diagram of an apparatus for transportation monitoring provided according to another embodiment of the present disclosure.

Optionally, as shown in FIG. 6, the monitoring module 12 may include a status determination unit 121 and a monitoring and updating unit 122.

The status determination unit 121 is configured to determine, based on the force change information, status information of a transportation component for transporting the transportation object.

The monitoring and updating unit 122 is configured to update the quantity of times of transportation that the transportation device transports the transportation object in a case that it is monitored, by using the status information, that the transportation component loads the transportation object, transports the transportation object to the target position, and unloads the transportation object at the target position.

In this embodiment, for the specific process for the status determination unit and the monitoring and updating unit to implement the above functions, reference may be made to the description of the corresponding part of the above method embodiments.

Optionally, the status determination unit 121 may include a first determination subunit and a second determination subunit.

The first determination subunit is configured to determine that the transportation object is loaded on the transportation component of the transportation device, in a case that a force value detected by the detector increases to be greater than a first threshold.

The second determination subunit is configured to determine that the transportation object loaded this time is unloaded from the transportation component, in a case that the force value detected by the detector decreases to be less than the first threshold.

It should be noted that, changes in the force value in the above determination subunit, such as increase or decrease are generally continuous changes in the same direction, so as to determine whether the transportation component is in a process of loading the transportation object or a process of unloading the transportation object. For determining a process of transporting the transportation object, whether the force value is maintained within a relatively fixed range may be monitored. For the specific implementation process, reference may be made to the description of the corresponding part of the above method embodiments.

Figure 7:
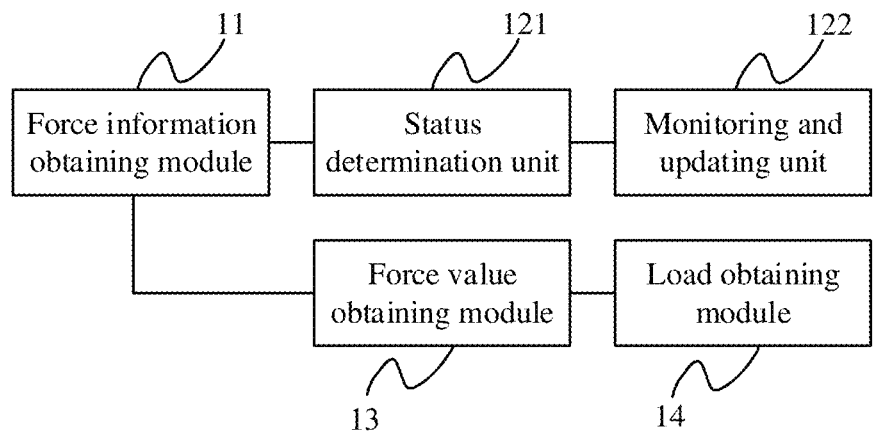
FIG. 7 is a schematic structural diagram of an apparatus for transportation monitoring provided according to another embodiment of the present disclosure.

In another optional embodiment of the present disclosure, on the basis of the above embodiments, automatic monitoring of the weight of the transported transportation object may further be realized in the present disclosure. As shown in FIG. 7, the apparatus may further include a force value obtaining module 13 and a load obtaining module 14.

The force value obtaining module 13 is configured to obtain a first force value of the transportation device after the transportation object is loaded on the transportation device, and a second force value of the transportation device in a case that the transportation object is not loaded on the transportation device.

In this embodiment, the required first force value and second force value may be filtered from all the obtained force values, or the force value that meets the condition may be directly extracted in the process of obtaining the force value from the detector to calculate the subsequent load value, which is not limited in the present disclosure.

In addition, for the specific method for obtaining the first force value and the second force value, reference may be made to the description of the corresponding part of the above method embodiments.

The load obtaining module 14 is configured to obtain, based on a force difference between the first force value and the second force value, a load value of the transportation object transported by the transportation device this time.

Optionally, in an embodiment, the apparatus may further include an identity information obtaining module, an association establishment module and a data sending module. The identity information obtaining module is configured to obtain identity information of a current operator of the transportation device. The association establishment module is configured to establish an association between the identity information and an updated quantity of times of transportation that the transportation device transports the transportation object. The data sending module is configured to send the updated quantity of times of transportation and the association to a server.

In practice, after the total quantity of times of transportation and the total load value of the transportation object transported by the transportation device are obtained in the present disclosure by adopting the above method, these data may be associated with the identity information of the operator and be uploaded to the server for subsequent query. In a case that the server already is stored with the same type of data, the stored data may be updated to make the server store the latest data, so as to ensure the reliability of subsequent query results. For the specific implementation process, reference may be made to the description of the corresponding part of the above method embodiments.

Optionally, the data sending module may be further adopted by the present disclosure to upload the detected force change information, the updated quantity of times of transportation, load values and other data to the server for subsequent query.

Figure 8:
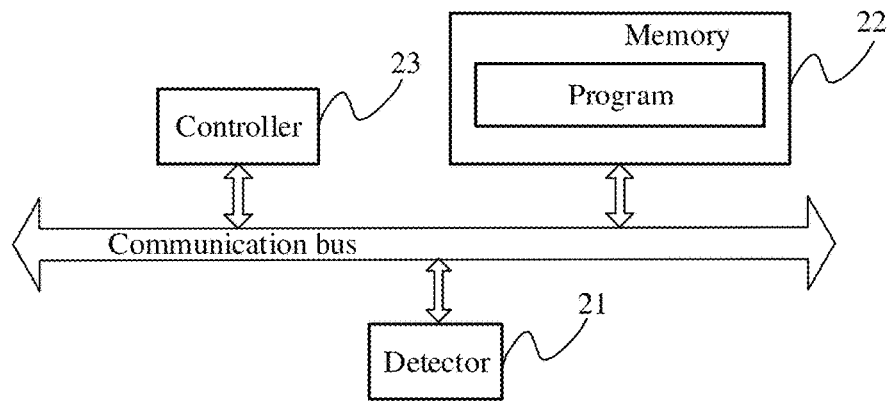
FIG. 8 is a schematic diagram of a hardware structure of a system for transportation monitoring provided according to an embodiment of the present disclosure.

Reference is made to FIG. 8, which is a schematic diagram of a hardware structure of a system for transportation monitoring provided according to an embodiment of the present disclosure. The system may be applied to transportation device. As shown in FIG. 8, the system may include a detector 21, a memory 22, and a controller 23. The detector 21 is configured to detect force change information of the transportation device. The memory 22 is configured to store a program for implementing the above method for transportation monitoring. The controller 23 is configured to load and execute the program stored in the memory to implement the above method for transportation monitoring. For the specific implementation process, reference may be made to the description of the corresponding part of the above method embodiments.

The detector 21 may include one or more of a pressure sensor, a tension sensor, a metal deformation switch, which is not limited here. Different types of detectors may be installed on different positions of the transportation device to ensure the force values obtained by the detectors can represent each stage in a process that the transportation component transports the transportation object and represent the weight of the transportation object. For example, the pressure sensor may be installed on the transportation component or an oil path of the transportation device; the tension sensor may be installed on the transportation component; the metal deformation switch may be installed on the transportation component. Specific installation positions may be determined according to actual requirements.

Figure 9:
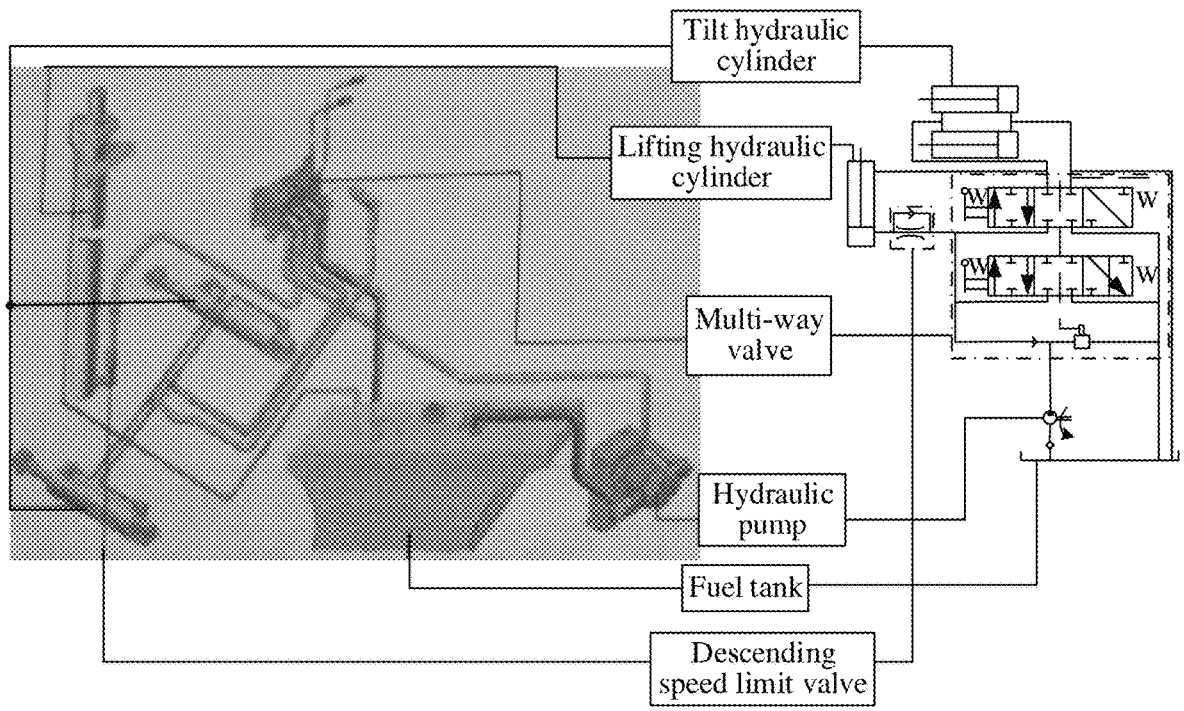
FIG. 9 is a schematic diagram of a hardware structure of a system for transportation monitoring provided according to another embodiment of the present disclosure.

Optionally, in a case that the above pressure sensor is a hydraulic sensor, as shown in FIG. 9, which is a schematic diagram of a hardware structure of a system for transportation monitoring according to another embodiment of the present disclosure, the system may further include a power mechanism. The power mechanism is configured to control the transportation component to move according to a preset trajectory, to cause the transportation component to load the transportation object, and to unload the transportation object after the transportation object is transported to the target position.

Correspondingly, the above detector may also include one or more of a position sensor, a photoelectric sensor, a travel sensor, and a proximity switch installed on the transportation device.

As shown in FIG. 9, the power mechanism may include multiple hydraulic cylinders, hydraulic pumps, multi-way valves, or the like. According to the transportation requirements of the transportation object, the hydraulic cylinders may include lifting hydraulic cylinders, tilt hydraulic cylinders, etc., so that corresponding mechanical component of the transportation components reciprocates up and down, tilt, etc.

The transportation device embodied as a forklift and the transportation component embodied as a pallet fork are taken as an example. When loading goods (i.e., the transportation object), the lifting hydraulic cylinder may be controlled to move in the first direction to make the pallet fork drop below the goods and the tilt hydraulic cylinder is controlled to operate to make the pallet fork tilt by a certain tilt angle, so that the pallet fork stably forks the goods. After that, the lifting hydraulic cylinder is controlled to move in the second direction, so that the pallet fork with the goods rises to a certain height, and then starting to transport the goods. After the forklift reaches a target position, the lifting hydraulic cylinder and the tilting hydraulic cylinder are controlled similarly to the loading process, so that the pallet fork is lowered to a specified position and tilted to complete the unloading of the goods. The implementation process is not limited to the one described herein.

In the hydraulic control process described above, a hydraulic sensor may be provided on an oil path. In this way, the hydraulic sensor is capable of determine a force value of the pallet fork of the forklift by detecting a pumping flow, thereby further determining whether the forklift is loaded or not at this time. The implementation process of the hydraulic control of the forklift is not limited in the present disclosure, which may be determined in combination with the principle of hydraulic control and transportation requirements, and are not described in detail here.

Optionally, in the above system, a descending speed limit valve may further be provided to detect a descending speed of the transportation component, and in a case that the detected speed value is greater than a speed threshold, corresponding prompt information may be outputted through a prompt device to remind the operator to slow down, so as to avoid out of control caused by high speed operation.

In addition, in order to further realize the accurate monitoring of a transportation process that the transportation device transports the transportation object, an obstacle sensor, a position sensor may be further adopted in the present disclosure to detect whether the transportation component reaches a preset position, so as to avoid the transportation component being damaged caused by exceeding the preset position during an operation process of moving up and down. In addition, accurate positioning of the transportation object may be realized to improve the transportation efficiency of the transportation object. Further, parameters collected by these sensors may be adopted to determine a motion travel of the transportation component of the transportation device. Furthermore, whether the motion travel of the transportation component exceeds a motion travel range is monitored, and whether to continue operations such as obtaining the force value of the transportation component is determined based on the specific monitoring results. The specific implementation process may refer to the description of the corresponding part of the above method embodiments. In addition, installation position of these sensors may be reasonably set according to actual requirements in the present disclosure, which is not described in detail in the present disclosure.

In a case that a signal sensed by the above sensor is inconsistent with a preset signal, warning may be performed by an alarm. The alarm may be an indicator light, a display, a buzzer or a voice module, etc. For alarms with different structures, the methods for outputting indication information may be different, which is not limited in the present disclosure.

Figure 10:
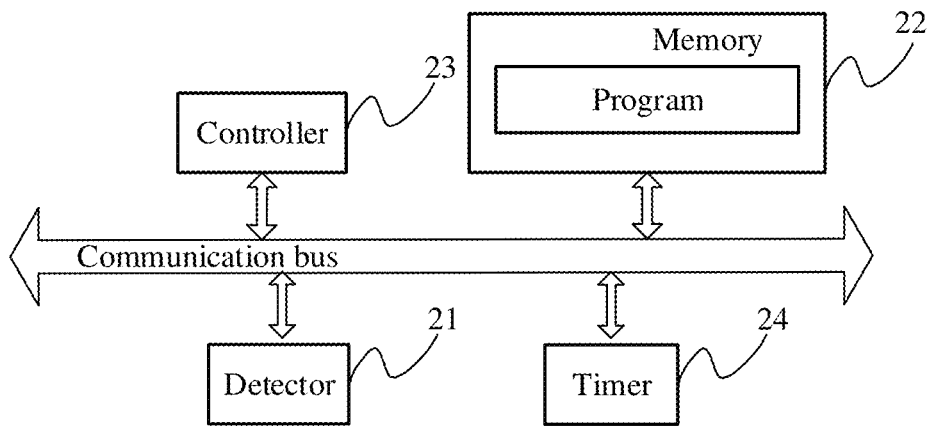
FIG. 10 is a schematic diagram of a hardware structure of a system for transportation monitoring provided according to another embodiment of the present disclosure.

In an optional embodiment of the present disclosure, in combination with the steps of the method for transportation monitoring described in the above method embodiments, in the present disclosure, interference on the obtained quantity of times of transportation caused by midway unloading of the transportation object may be eliminated by monitoring the time difference between a loading time and an unloading time of the transportation object. The specific implementation process may refer to the description of the corresponding part of the above method embodiments. It can be seen that, as shown in FIG. 10, the system for transportation monitoring provided according to the present disclosure may further include a timer 24 configured to record a loading time when the transportation object is loaded on the transportation device and an unloading time when the transportation object is unloaded from the transportation device.

In this case, the controller 23 executes the program to implement the following steps: obtaining a first time difference between an unloading time when the transportation object loaded this time is unloaded from the transportation component and a loading time when the transportation object loaded this time is loaded on the transportation component; and remaining, in a case that the first time difference is less than a first duration threshold, the quantity of times of transportation that the transportation device transports the transportation object unchanged after determining that the transportation object loaded this time is unloaded, until a next obtained first time difference is no less than the first duration threshold; updating the quantity of times of transportation that the transportation device transports the transportation object, in a case that the next obtained first time difference is no less than the first duration threshold. The next obtained first time difference is obtained by taking a time when the transportation object is unloaded next time as a new unloading time of the transportation object, and calculating a difference between the new unloading time and the loading time.

And/or, the timer 24 is configured to obtain a second time difference between the unloading time when the transportation object loaded this time is unloaded from the transportation component and a loading time when a transportation object loaded adjacent next time is loaded on the transportation component. Correspondingly, the controller 23 executes the program to implement the following steps: remaining, in a case that the second time difference is less than a second duration threshold, the quantity of times of transportation that the transportation device transports the transportation object unchanged, after determining that the transportation object loaded next time is unloaded.

In addition, the timer may be adopted in the present disclosure to record the transportation duration of each transportation process, the transportation durations may be accumulated to calculate the total transportation duration that transportation device transports the transportation objects for subsequent query. Moreover, the accuracy of the obtained quantity of times of transportation is improved through the verification method based on the time difference proposed in the present disclosure.

Optionally, a load value of the transportation object transported each time may be recorded in the present disclosure to calculate the total load value of the transportation objects transported by the transportation device. Therefore, the controller 23 executes the program to implement the following steps: obtaining a first force value of the transportation device after the transportation object is loaded on the transportation device, and a second force value of the transportation device in a case that the transportation object is not loaded on the transportation device; and obtaining, based on a force difference between the first force value and the second force value, a load value of the transportation object transported by the transportation device this time.

Further, in the present disclosure, data such as the updated quantity of times of transportation, the load value of each transportation, the total load value may be uploaded to the server. Therefore, the above system may further include a communication module configured to upload data such as the updated quantity of times of transportation, the total transportation duration and/or the total load value, and an association between the data and the identity information of the operator to the server, so that the server generates corresponding reports based on the data and the association. The reports are convenient for the manager or the operator to view.

The communication module may also directly upload the obtained data to the server, without generating the association between the data and the identity information of the operator, which may be determined according to actual requirements. The specific structure of the communication module may be determined based on the communication mode between the system for transportation monitoring and the server, which is not limited in the present disclosure. A wireless communication module is generally preferred, but it is not limited here.

Figure 11:
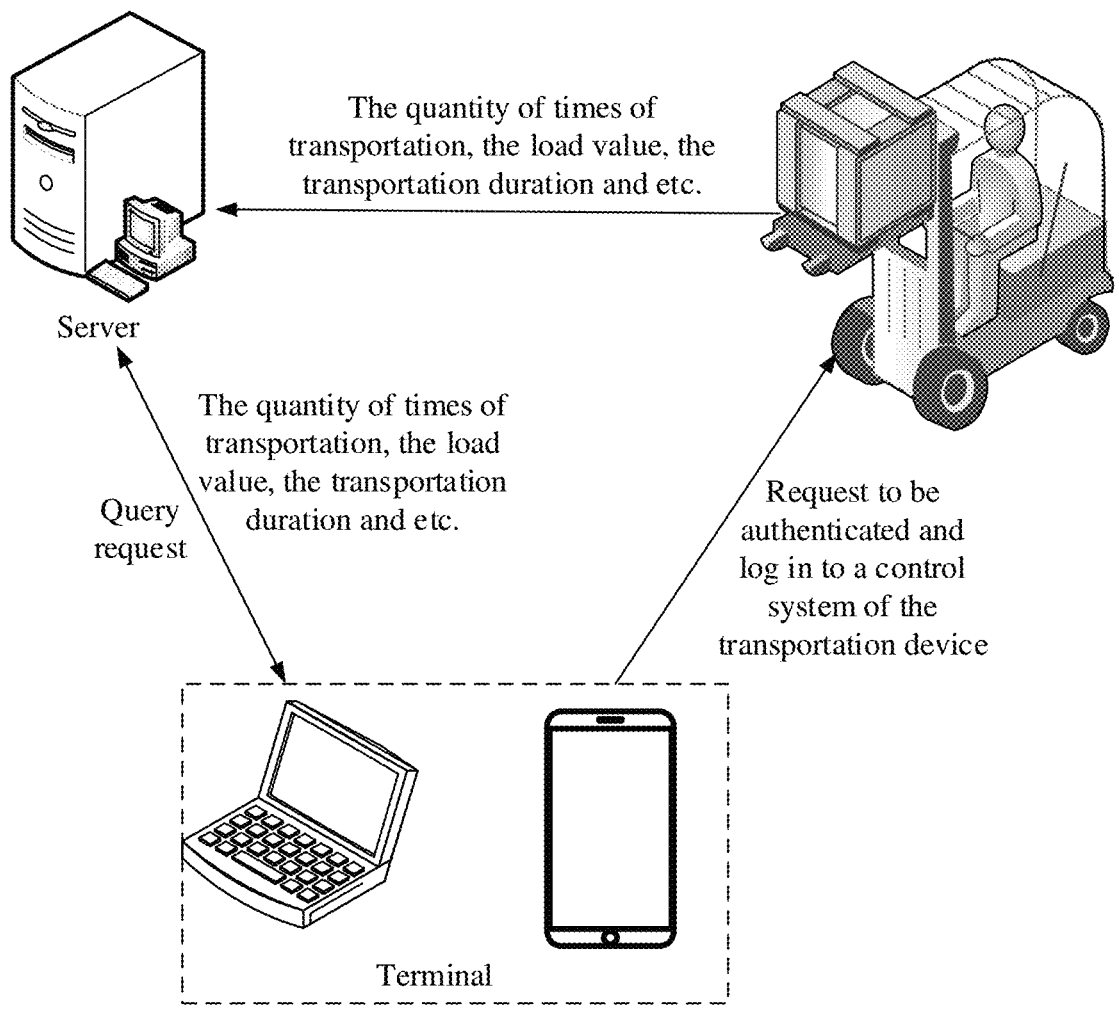
FIG. 11 is a schematic diagram of an application scenario of a system for transportation monitoring provided according to an embodiment of the present disclosure.

Based on the description of a solution for transportation monitoring in the above embodiments, referring to the application scenario shown in FIG. 11, the system for transportation monitoring described in the above system embodiment may be provided in a transportation device operated by an operator. The transportation device may communicate with a server or a terminal. In practice, the operator may use the terminal such as a mobile phone to try to log in to the control system of the transportation device, or may perform authentication to log in to the control system directly on the operation interface of the transportation device. After the authentication is passed, the operator may operate the transportation device to carry out operations, such as operating the transportation component of the transportation device to move, to load the transportation object and to transport the transportation object to the target position for unloading. In this process, the method described in the above method embodiments may be used to automatically obtain data, such as the quantity of times of transportation and the transportation duration that the transportation device transports the transportation object, the load value of the transportation object in each transportation, and the total load value of the transportation. The data is recorded without manual operation, which greatly improves the work efficiency and the data accuracy.

After that, the transportation device may upload the obtained data as described above to the server through the communication module, and the server generates and stores a corresponding data report based on the obtained data. In this way, when a query request initiated by a manager or the operator using the terminal is received, in order to respond the query request, the data corresponding to the query, such as the quantity of times of transportation, the load value and/or the transportation duration of a certain operator, may be fed back to the terminal for display, which is very convenient and beneficial to the supervision of each operator and each transportation device.

It should be noted that the application scenario of the solution for transportation monitoring provided according to the present disclosure is not limited to the scenario shown in FIG. 11, and the transportation device is not limited to the forklift shown in FIG. 11. In the present disclosure, the scenario implementation of the transportation monitoring may be appropriately adjusted according to the extension on functions of the forklift, which is not described here.

Finally, it should be noted that in the above embodiments, relational terms such as first, second are only used to distinguish one operation or module from another operation or module, and do not necessarily require or imply that there is any such actual relationship or sequence between these modules or operations.

The above embodiments are described in a progressive manner. Each of the embodiments is mainly focused on describing its differences from other embodiments, and reference may be made among these embodiments with respect to the same or similar parts. For the apparatus and system disclosed in the embodiments, since the apparatus corresponds to the method disclosed in the embodiments, and the system includes the apparatus, the description thereof is relatively simple. For relate parts, reference may be made to the description of the method part.

The above illustration of the disclosed embodiments can enable those skilled in the art to implement or use the present disclosure. Various modifications to the embodiments are apparent to the person skilled in the art, and the general principle herein can be implemented in other embodiments without departing from the spirit or scope of the present disclosure. Therefore, the present disclosure is not limited to the embodiments described herein, but should be in accordance with the widest scope consistent with the principle and novel features disclosed herein.

The invention claimed is:

1. A method for transportation monitoring, comprising:
obtaining force change information of a transportation device detected by a detector; and
monitoring, based on the force change information, a quantity of times of transportation that the transportation device loads a transportation object at an initial position, transports the transportation object to a target position, and unloads the transportation object at the target position,
wherein the monitoring, based on the force change information, a quantity of times of transportation that the transportation device loads a transportation object at an initial position, transports the transportation object to a target position, and unloads the transportation object at the target position comprises:
determining, based on the force change information, status information of a transportation component for transporting the transportation object; and
updating the quantity of times of transportation that the transportation device transports the transportation object in a case that it is monitored, by using the status information, that the transportation component loads the transportation object, transports the transportation object to the target position, and unloads the transportation object at the target position;
wherein the determining, based on the force change information, status information of a transportation component for transporting the transportation object comprises:
determining that the transportation object is loaded on the transportation component of the transportation device, in a case that a force value detected by the detector increases to be greater than a first threshold; and
determining that the transportation object loaded this time is unloaded from the transportation component, in a case that the force value detected by the detector decreases to be less than the first threshold, and
wherein the method further comprises:
obtaining a first time difference between an unloading time when the transportation object loaded this time is unloaded from the transportation component and a loading time when the transportation object loaded this time is loaded on the transportation component; and
remaining, in a case that the first time difference is less than a first duration threshold, the quantity of times of transportation that the transportation device transports the transportation object unchanged after determining that the transportation object loaded this time is unloaded, until a next obtained first time difference is no less than the first duration threshold; updating the quantity of times of transportation that the transportation device transports the transportation object, in a case that the next obtained first time difference is no less than the first duration threshold; wherein the next obtained first time difference is obtained by taking a time when the transportation object is unloaded next time as a new unloading time of the transportation object, and calculating a difference between the new unloading time and the loading time;
and/or;
obtaining a second time difference between the unloading time when the transportation object loaded this time is unloaded from the transportation component and a loading time when a transportation object loaded adjacent next time is loaded on the transportation component; and remaining, in a case that the second time difference is less than a second duration threshold, the quantity of times of transportation that the transportation device transports the transportation object unchanged, after determining that the transportation object loaded next time is unloaded.

2. The method according to claim 1, wherein the obtaining force change information of a transportation device detected by a detector comprises:
obtaining a motion travel of the transportation component of the transportation device;
obtaining the force value of the transportation device detected by the detector, in a case that the motion travel meets a preset condition; and
controlling the detector to stop detecting the force value of the transportation device or controlling the detector to stop responding to the force value detected by the detector, in a case that the motion travel does not meet the preset condition; and/or remaining a current status of the transportation component unchanged until the obtained motion travel meets the preset condition, and updating the current status of the transportation component in a case that the obtained motion travel meets the preset condition.

3. The method according to claim 2, further comprising:
obtaining a motion travel range of the transportation component of the transportation device and a second threshold corresponding to the motion travel range, wherein the motion travel range represents a motion route and a position of the transportation component, the second threshold is greater than the first threshold; and
performing a preset operation, in a case that the force value detected by the detector is greater than the second threshold.

4. The method according to claim 1, further comprising:
obtaining a first force value of the transportation device after the transportation object is loaded on the transportation device, and a second force value of the transportation device in a case that the transportation object is not loaded on the transportation device; and
obtaining, based on a force difference between the first force value and the second force value, a load value of the transportation object transported by the transportation device this time.

5. The method according to claim 1, further comprising:
obtaining identity information of a current operator of the transportation device;
establishing an association between the identity information and an updated quantity of times of transportation that the transportation device transports the transportation object; and
sending the updated quantity of times of transportation and the association to a server.

6. An apparatus for transportation monitoring, comprising:
a force information obtaining module configured to obtain force change information of a transportation device detected by a detector; and
a monitoring module configured to monitor, based on the force change information, a quantity of times of transportation that the transportation device loads a transportation object at an initial position, transports the transportation object to a target position, and unloads the transportation object at the target position,
wherein the monitoring module comprises:
a status determination unit configured to determine, based on the force change information, status information of a transportation component for transporting the transportation object; and
a monitoring and updating unit configured to update the quantity of times of transportation that the transportation device transports the transportation object in a case that it is monitored, by using the status information, that the transportation component loads the transportation object, transports the transportation object to the target position, and unloads the transportation object at the target position,
wherein the status determination unit comprises:
a first determination subunit configured to determine that the transportation object is loaded on the transportation component of the transportation device, in a case that a force value detected by the detector increases to be greater than a first threshold; and
a second determination subunit configured to determine that the transportation object loaded this time is unloaded from the transportation component, in a case that the force value detected by the detector decreases to be less than the first threshold, and
wherein the apparatus further comprises:
a timer configured to obtain a first time difference between an unloading time when the transportation object loaded this time is unloaded from the transportation component and a loading time when the transportation object loaded this time is loaded on the transportation component; and a controller configured to remain, in a case that the first time difference is less than a first duration threshold, the quantity of times of transportation that the transportation device transports the transportation object unchanged after determining that the transportation object loaded this time is unloaded, until a next obtained first time difference is no less than the first duration threshold, and update the quantity of times of transportation that the transportation device transports the transportation object, in a case that the next obtained first time difference is no less than the first duration threshold, wherein the next obtained first time difference is obtained by taking a time when the transportation object is unloaded next time as a new unloading time of the transportation object, and calculating a difference between the new unloading time and the loading time;

and/or;

the timer configured to obtain a second time difference between the unloading time when the transportation object loaded this time is unloaded from the transportation component and a loading time when a transportation object loaded adjacent next time is loaded on the transportation component; and the controller configured to remain, in a case that the second time difference is less than a second duration threshold, the quantity of times of transportation that the transportation device transports the transportation object unchanged, after determining that the transportation object loaded next time is unloaded.

7. A system for transportation monitoring, comprising:
a detector configured to detect force change information;
a memory configured to store a program; and
a controller configured to load and execute the program stored in the memory, wherein the program is executed to:
obtain the force change information detected by the detector; and
monitor, based on the force change information, a quantity of times of transportation that a transportation device loads a transportation object at an initial position, transports the transportation object to a target position, and unloads the transportation object at the target position,
wherein the monitor, based on the force change information, a quantity of times of transportation that the transportation device loads a transportation object at an initial position, transports the transportation object to a target position, and unloads the transportation object at the target position comprises:
determining, based on the force change information, status information of a transportation component for transporting the transportation object; and
updating the quantity of times of transportation that the transportation device transports the transportation object in a case that it is monitored, by using the status information, that the transportation component loads the transportation object, transports the transportation object to the target position, and unloads the transportation object at the target position,
wherein the determining, based on the force change information, status information of a transportation component for transporting the transportation object comprises:
determining that the transportation object is loaded on the transportation component of the transportation device, in a case that a force value detected by the detector increases to be greater than a first threshold; and
determining that the transportation object loaded this time is unloaded from the transportation component, in a case that the force value detected by the detector decreases to be less than the first threshold, and
wherein the program is further executed to:
obtain a first time difference between an unloading time when the transportation object loaded this time is unloaded from the transportation component and a loading time when the transportation object loaded this time is loaded on the transportation component; and remain, in a case that the first time difference is less than a first duration threshold, the quantity of times of transportation that the transportation device transports the transportation object unchanged after determining that the transportation object loaded this time is unloaded, until a next obtained first time difference is no less than the first duration threshold; update the quantity of times of transportation that the transportation device transports the transportation object, in a case that the next obtained first time difference is no less than the first duration threshold; wherein the next obtained first time difference is obtained by taking a time when the transportation object is unloaded next time as a new unloading time of the transportation object, and calculating a difference between the new unloading time and the loading time;

and/or;

obtain a second time difference between the unloading time when the transportation object loaded this time is unloaded from the transportation component and a loading time when a transportation object loaded adjacent next time is loaded on the transportation component; and remain, in a case that the second time difference is less than a second duration threshold, the quantity of times of transportation that the transportation device transports the transportation object unchanged, after determining that the transportation object loaded next time is unloaded.

8. The system according to claim 7, wherein the detector comprises one or more of a pressure sensor, a tension sensor, and a metal deformation switch;

wherein the pressure sensor is installed on a transportation component or an oil path of the transportation device;

the tension sensor is installed on the transportation component; and the metal deformation switch is installed on the transportation component.

9. The system according to claim 8, wherein in a case that the pressure sensor is a hydraulic pressure sensor, the system further comprises:

a power mechanism configured to control the transportation component to move according to a preset trajectory, to cause the transportation component to load the transportation object, and to unload the transportation object after the transportation object is transported to the target position;

wherein the detector further comprises one or more of a position sensor, a photoelectric sensor, a travel sensor, and a proximity switch which are installed on the transportation device.

\* \* \* \* \*